United States Patent [19]

Simbal

[11] Patent Number: 5,481,405
[45] Date of Patent: Jan. 2, 1996

[54] STEPLESS MICROGRAPHIC ZOOM LENS HAVING LARGE MAGNIFICATION RATIO

[75] Inventor: John J. Simbal, Woodbury, Minn.

[73] Assignee: Minnesota Mining and Manufacturing Company, St. Paul, Minn.

[21] Appl. No.: 160,420

[22] Filed: Nov. 30, 1993

[51] Int. Cl.$^6$ .................................................. G02B 15/14
[52] U.S. Cl. .......................... 359/689; 359/679; 359/690
[58] Field of Search .................................... 359/689, 690, 359/679

[56] References Cited

U.S. PATENT DOCUMENTS

| 4,733,951 | 3/1988 | Pareigat | 359/691 |
| 4,743,102 | 5/1988 | Pareigat | 359/691 |
| 4,746,204 | 5/1988 | Pareigat | 359/691 |
| 4,750,820 | 6/1988 | Pareigat | 359/691 |
| 5,087,987 | 2/1992 | Simbal | 359/663 |

Primary Examiner—Scott J. Sugarman
Attorney, Agent, or Firm—Gary L. Griswold; Walter N. Kirn; William D. Bauer

[57] ABSTRACT

A stepless zoom lens useful in micrographic applications providing stepless magnfications from 6.8x to 32x, a zoom ratio exceeding 4.7 to 1. Fourteen elements are arranged in three groups. An object to image distance of 1,750 millimeters is maintained. The first group consists of a cemented doublet air spaced from a single meniscus element, for a total of three elements in the group. The second group consists of a meniscus element air spaced from a cemented doublet, which is in turn air spaced from a second meniscus element, a total of four elements in the group. The third group consists of a biconvex element air spaced from a cemented doublet, followed in order by an air space, a meniscus, an air space and a final doublet, for a total of seven elements in the group.

5 Claims, 9 Drawing Sheets

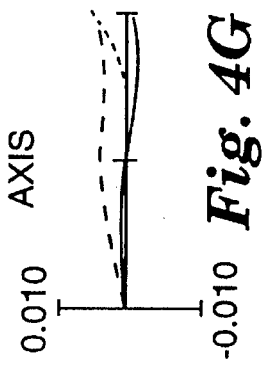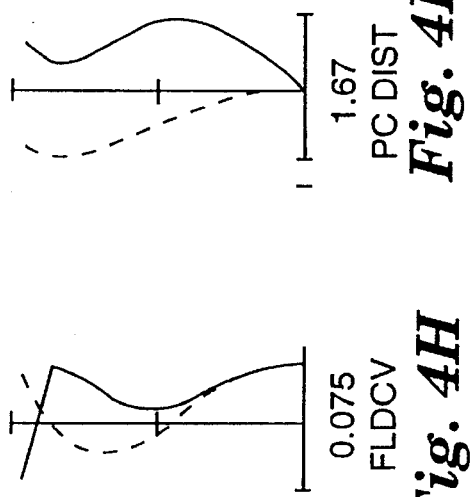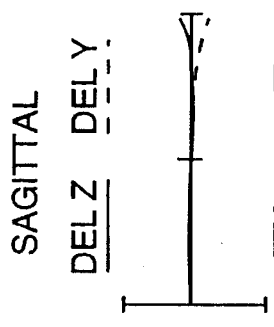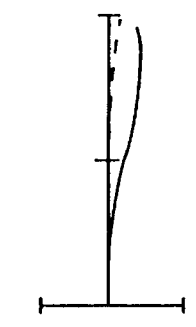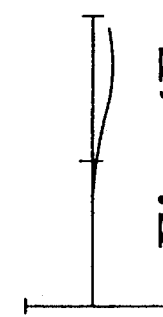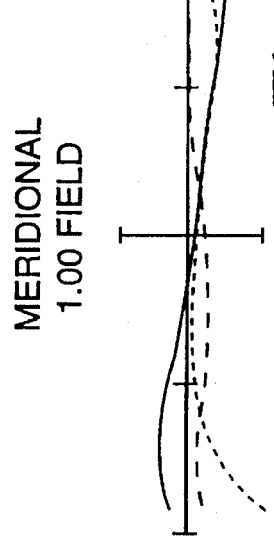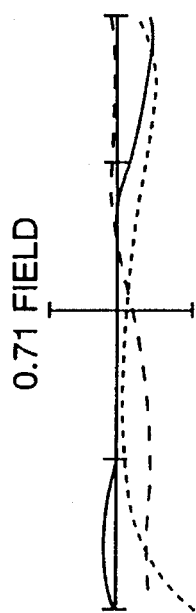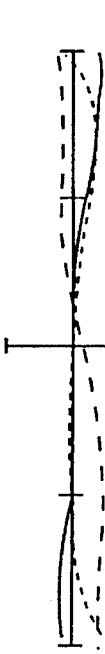

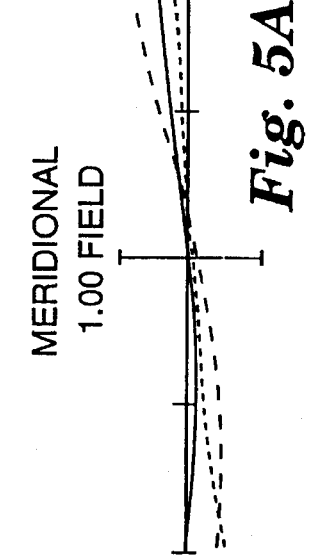
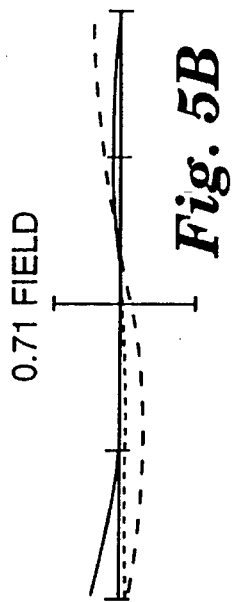
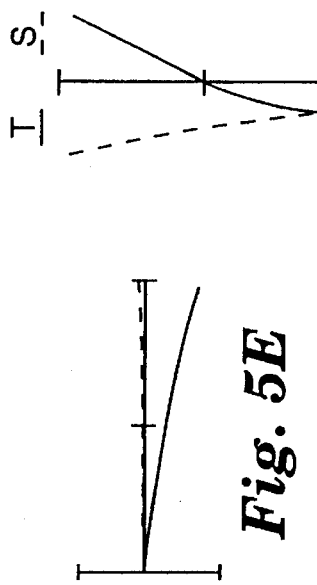
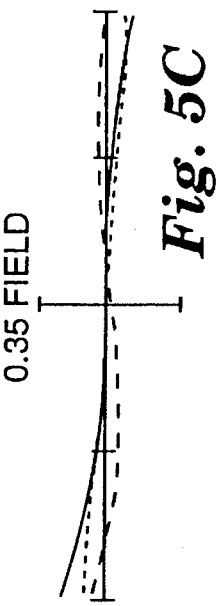
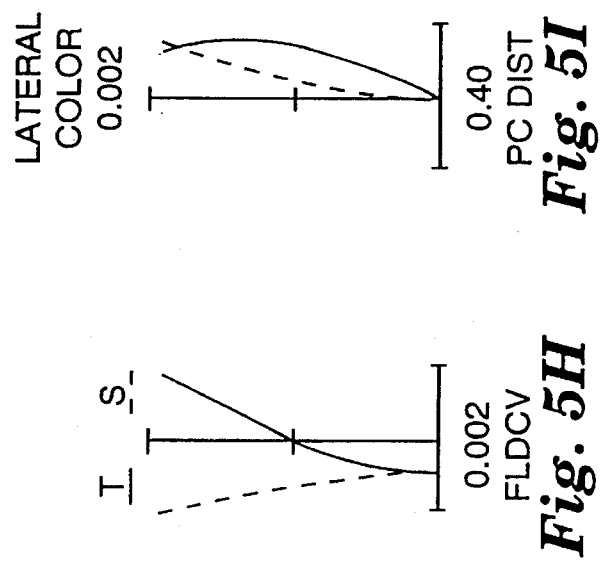

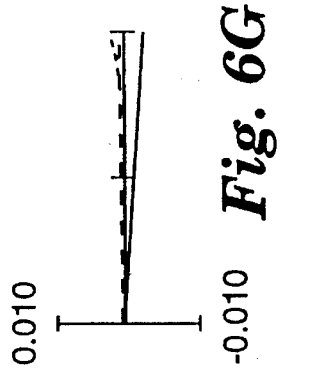
*Fig. 6G*
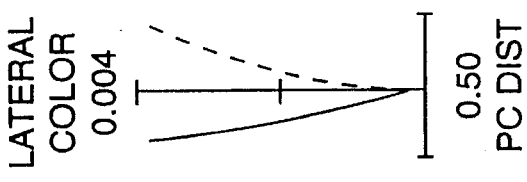
*Fig. 6I*
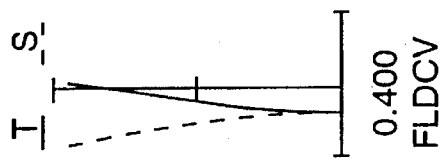
*Fig. 6H*
— 0.5876 ····· 0.4861 -- 0.6563
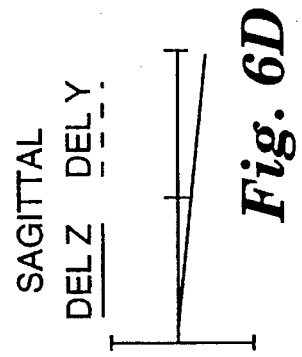
*Fig. 6D*
*Fig. 6E*
*Fig. 6F*
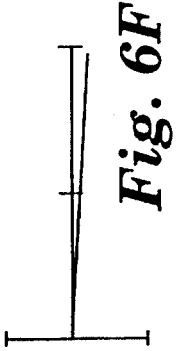
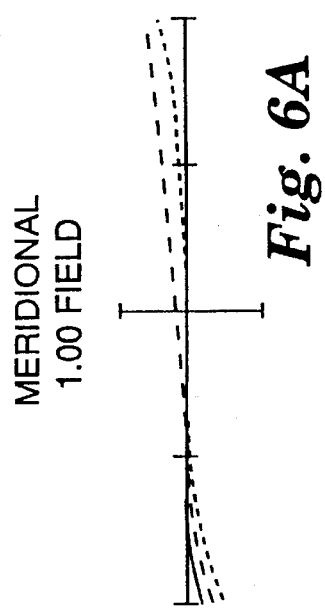
*Fig. 6A*
*Fig. 6B*
*Fig. 6C*
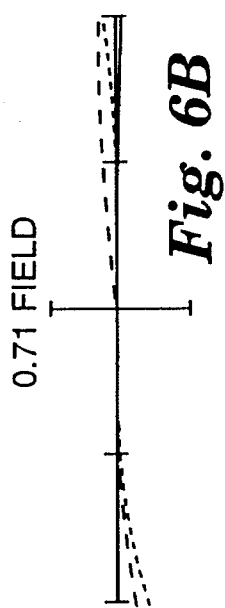

STEPLESS MICROGRAPHIC ZOOM LENS HAVING LARGE MAGNIFICATION RATIO

TECHNICAL FIELD

This invention generally relates to zoom lenses and, more particularly, to stepless zoom lenses having a large magnification ratio suitable for use in micrographic applications.

BACKGROUND OF THE INVENTION

Microfilm is commonly used to archive documents and substantially reduces the volume required for storage of documents due to a significant reduction in document (image) size. To read or view a document which has been placed on microfilm a microfilm reader, printer or reader/printer is utilized. The microfilm reader and/or printer enlarges the image (document) to viewable or printable size.

Micrographic readers, printers or reader/printers typically require variable magnification ratios and typically must use up to 35 millimeter format microfilm. Microfilm currently existing in the market is filmed at a variety of reductions. Hence, a single magnification will not provide optimum enlargement for more than a single reduction.

When a user possesses microfilm recorded at different reductions, it is necessary to have a means to vary the enlargement to bring either the viewed or printed image back to the original dimensions. Moreover, it is sometimes desirable to bring back the image at a different magnification, either greater or smaller, than the magnification at which the original image was filmed.

There are three basic techniques to optically vary the magnification.

The first technique is to use a separate lens for each magnification. Since a separate lens must be used for each magnification, this "traditional" approach results in users requiring a multiplicity of lenses. This leads to increased cost, complexity and inconvenience of switching lenses. Further, this technique has the disadvantage of providing only discrete steps for magnification. For example, if a reader and/or printer provides 10x, 20x and 30x magnifications, three separate lenses are required. If a 24x magnification is desired, an additional separate 24x lens must be provided. If finer increments, say 0.5x, are desired, the number of additional lenses becomes, at best, impractical and, realistically, cost prohibitive.

The second technique is to vary the object to image distance. This technique is commonly used in photocopying machines and has been incorporated into some microfilm machines. This technique allows a single lens to provide multiple magnifications by varying the distance from the object (film) plane to the print plane. Such fixed focal length lenses do not provide optimum correction at multiple object to image distances and must still be refocused after each change in path length. Moreover, if a substantial range is to be covered, the path length must vary considerably. For example, if a 90 millimeter focal length lens is used to cover a magnification range of 8x to 30x, the path length will need to change by nearly 2 meters. Multiple paths or multiple lenses will alleviate this problem somewhat, but at the expense of added cost and complexity.

The third technique is to utilize a zoom lens which allows a stepless variation of magnification with a single fixed optical path.

Zoom lenses have been used in micrographic applications since at least the mid-nineteen eighties. Some of these zoom lenses are disclosed in U.S. Pat. No. 4,733,951, U.S. Pat. No. 4,743,102, U.S. Pat. No. 4,746,204 and U.S. Pat. No. 4,750,820, providing magnification ratios of 6.5x–14x, 12x–24x, 14x–32x and 20x –47x, respectively. These lenses are typically of two or three group construction. They are intended primarily for use with 16 millimeter microfilm and/or microfiche images and do not cover large format, i.e., 35 millimeter, microfilm images. Moreover, none of these lenses allows magnification to vary by more than a factor of 2.35 to 1.

A four group zoom lens is used in the 3M "Q-IV" printer, available from Minnesota Mining and Manufacturing Company, St. Paul, Minn., the assignee of the present invention. This zoom lens provides a 7.5x–24x magnification variation, a factor of 3.2 to 1, but is not capable of providing full-frame viewing on an 18 inch (45.7 centimeter) by 24 inch (61.0 centimeter) screen and is not capable of printing "E" size, i.e., 18 inch (45.7 centimeter) by 24 inch (61.0 centimeter), documents.

SUMMARY OF THE INVENTION

The zoom lens of the present invention provides stepless magnification from 6.8x–32x, a zoom ratio exceeding 4.7 to 1 in a simpler three group design. Angular coverage is such that an 18 inch (45.7 centimeter) by 24 inch (61.0 centimeter) screen will either be filled or will show the full format of a 35 millimeter aperture card thus allowing prints up the "E" size and ISO "A0" to be made with this lens. In the preferred embodiment, rectilinear distortion peaks at less than 1 percent at 32x and is less than 0.5 percent through the balance of the zoom range.

The lens is made up of 14 elements arranged in 3 groups. In the preferred embodiment, the lens functions with a fixed object to image distance of 1.75 meters. An optional 3 millimeter thick cover glass (which is not a part of the lens system) may cover the film. All three groups move within the lens system during zooming.

The first group consists of a cemented doublet air spaced from a single meniscus element, for a total of three elements. The second group, a total of four elements, consists of a meniscus element air spaced from a cemented doublet, which in turn is air spaced from a second meniscus element.

The third group, a total of seven elements, consists of a biconvex element air spaced from a cemented doublet, followed in order by an air space, a meniscus, an air space, a meniscus, an air space and a doublet.

An iris diaphragm, functioning as the aperture stop, is located in the air space between the first element and the first cemented doublet in the third group. The iris diaphragm is varied so as to produce a finite aperture of f/5 at 32x and f/20 at 6.8x in order to greatly increase depth of focus at the lower magnification to yield reasonable depth of field.

BRIEF DESCRIPTION OF THE DRAWINGS

The foregoing advantages, construction and operation of the present invention will become more readily apparent from the following description and accompanying drawings in which:

FIGS. 4A, 4B, 4C, 4D, 4E, 4F, 4G, 4H and 4I are graphs showing ray aberrations of the lens of FIG. 1 (at a magnification of 32x);

FIGS. 5A, 5B, 5C, 5D, 5E, 5F, 5G, 5H and 5I are graphs showing ray aberrations of the lens of FIG. 2 (at a magnification of 15x);

FIGS. 6A, 6B, 6C, 6D, 6E, 6F, 6G, 6H and 6I are graphs showing ray aberrations of the lens of FIG. 3 (at a magnification of 6.8x);

DETAILED DESCRIPTION OF THE PREFERRED EMBODIMENTS

Figure 1:
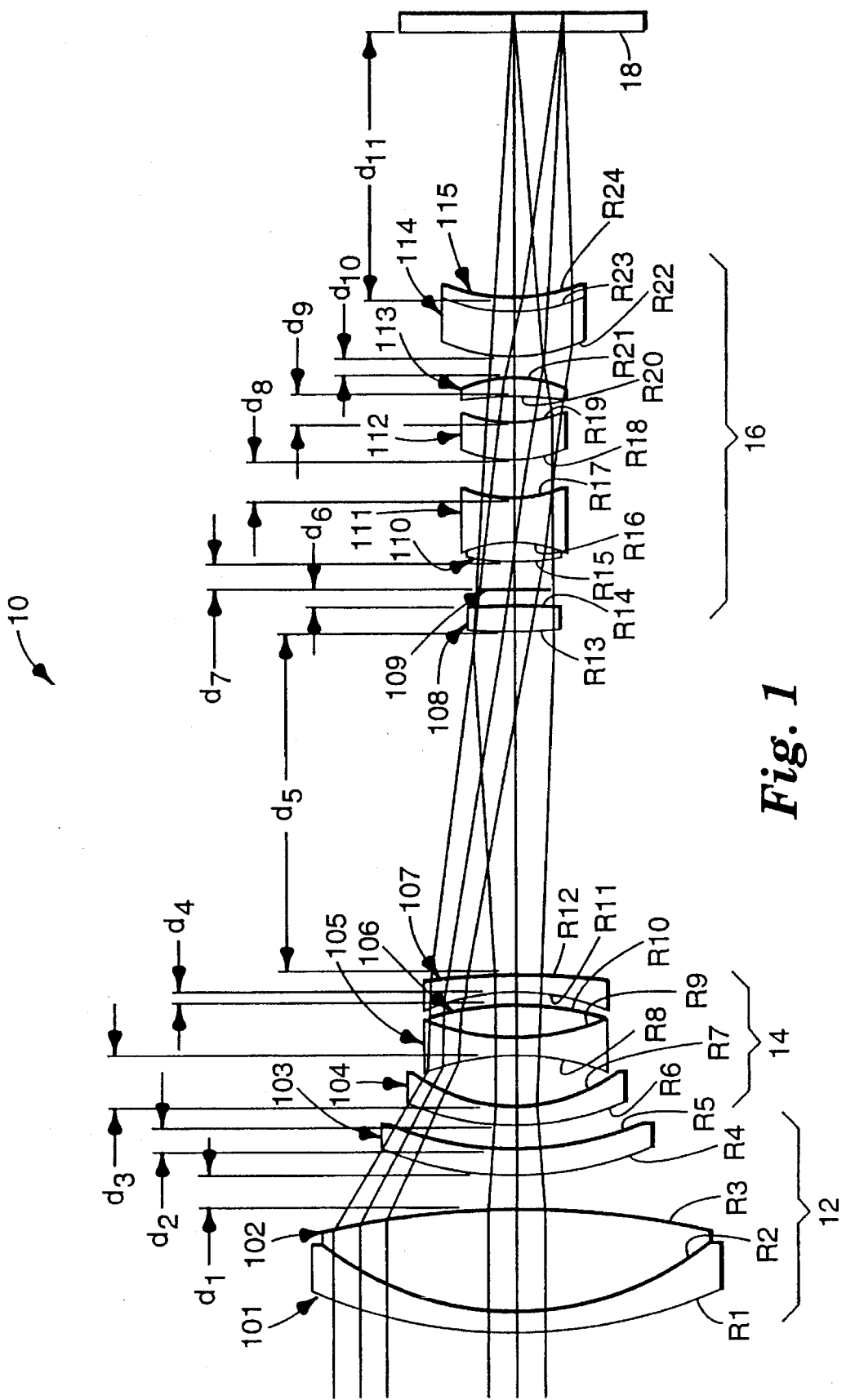
FIG. 1 is an illustration of a zoom lens constructed in accordance with the present invention at a magnification of 32x.
Figure 2:
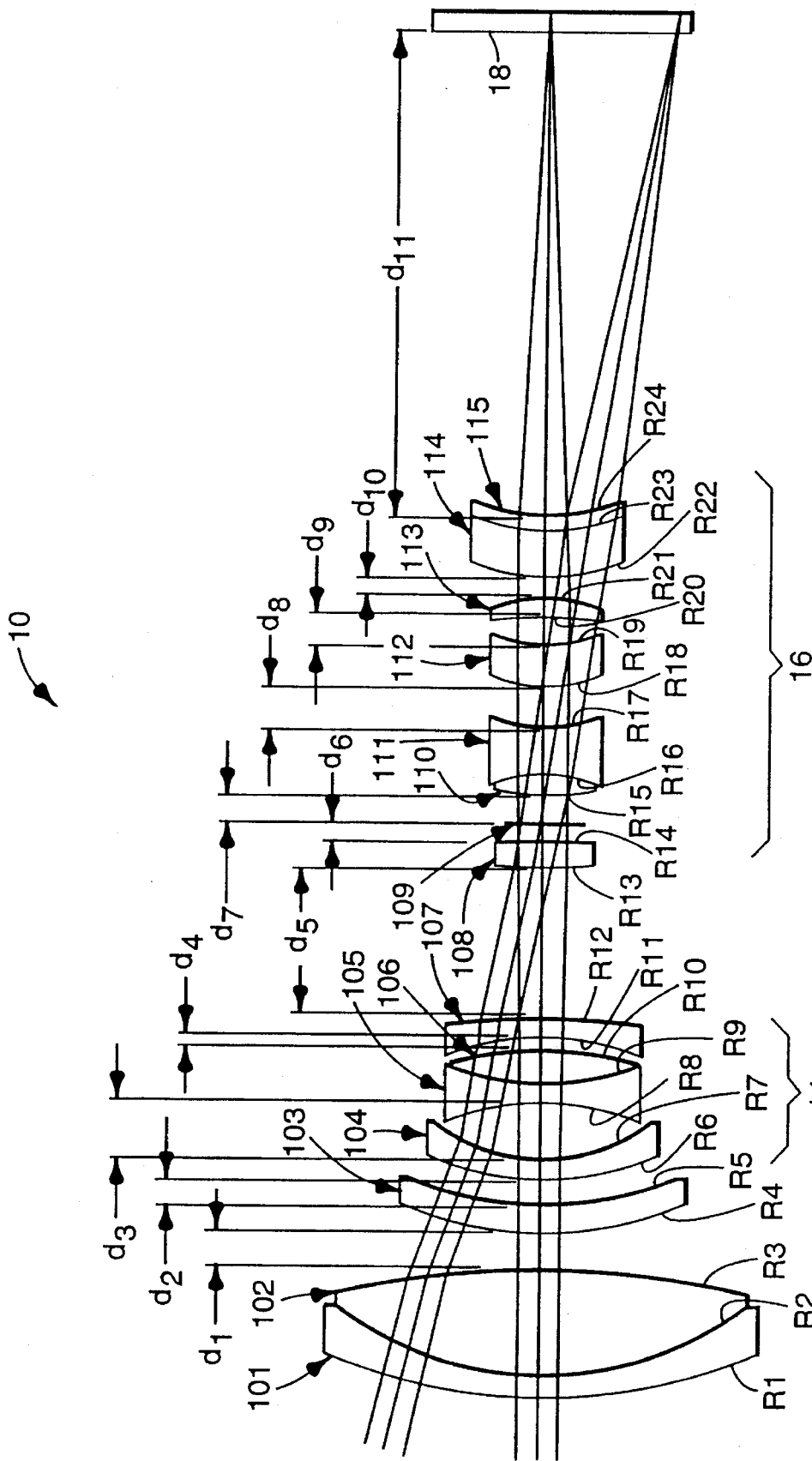
FIG. 2 is an illustration of a zoom lens constructed in accordance with the present invention at a magnification of 15x.
Figure 3:
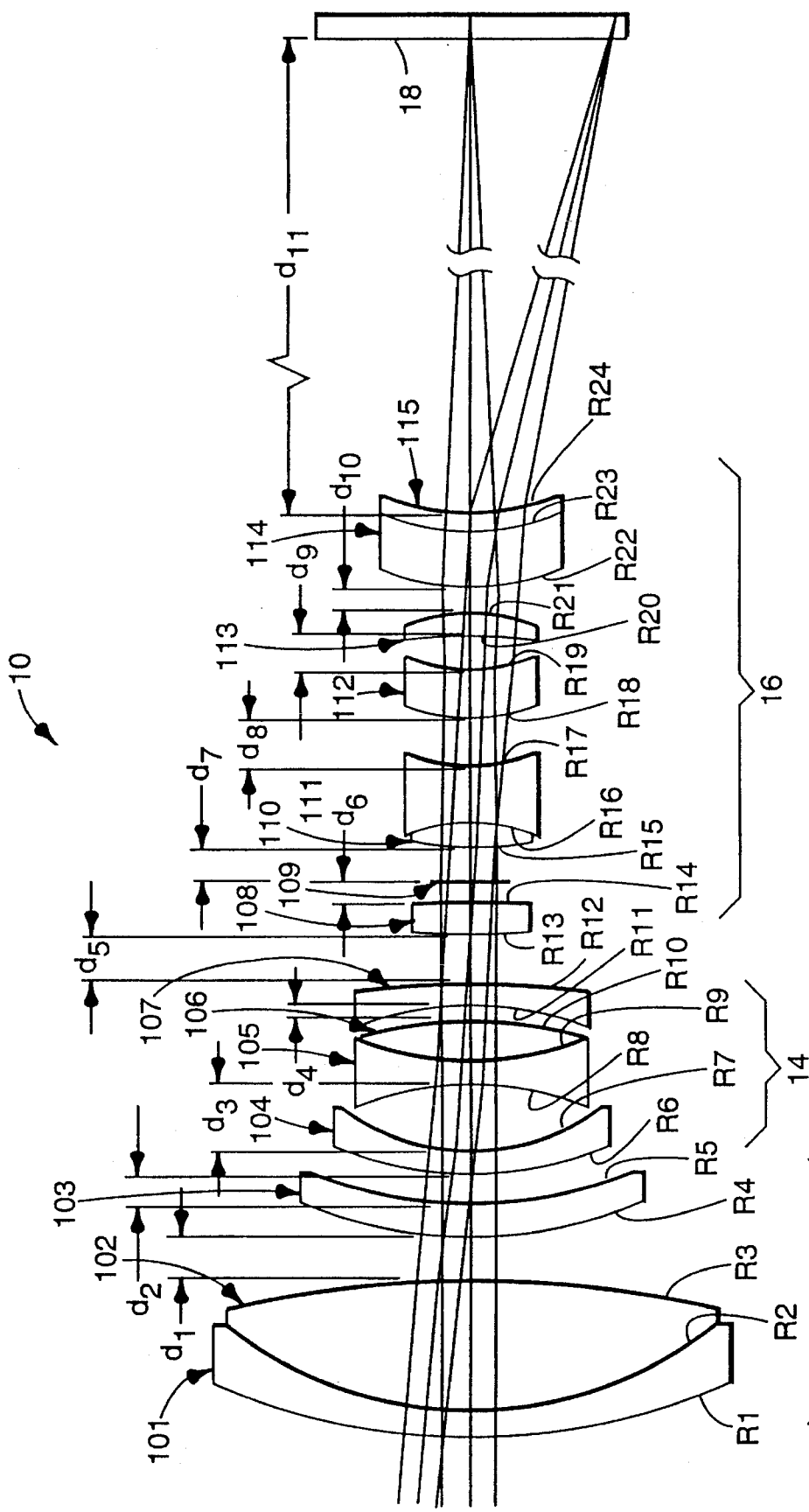
FIG. 3 is an illustration of a zoom lens constructed in accordance with the present invention at a magnification of 6.8x.

A preferred embodiment of the stepless zoom lens 10 of the present invention intended for micrographic applications is illustrated in FIGS. 1, 2 and 3. Zoom lens 10 provides stepless magnifications from 6.8x to 32x, with a zoom ratio exceeding 4.7 to 1. Zoom lens 10 may be varied to produce a finite aperture of f/5 lens at 32x and f/20 lens at 6.8x.

Zoom lens 10 is constructed of a first group 12, a second group 14 and a third group 16. All three groups move relative to each other in the zooming process. FIG. 1 illustrates the zoom lens 10 with groups 12, 14 and 16 arranged to provide a magnification of 32x. FIG. 2 illustrates the zoom lens 10 with groups 12, 14 and 16 arranged to provide a magnification of 15x. FIG. 3 illustrates the zoom lens 10 with groups 12, 14 and 16 arranged to provide a magnification of 6.8x.

Light is incident to zoom lens 10 from the right as illustrated in FIGS. 1, 2 and 3. The microfilm object (not shown) to be imaged is placed, preferably, against or adjacent to the right, or outside, surface of planar 3 millimeter thick glass platen 18. The incident light, after passing through the microfilm object and platen 18, passes in succession through the elements of group 16, group 14 and 12 before reaching imaging plane 20. While all three groups 12, 14 and 16 move relative to each other, zoom lens 10 keeps a fixed distance between glass platen 18 and imaging plane 20 constant at 1.75 meters.

The lens elements of zoom lens 10 will be described from left to right in FIGS. 1, 2 and 3, or in other words, in the direction opposite from the direction of incident light.

Group 12 consists of a cemented doublet air spaced from a single meniscus element, for a total of three elements, namely lens elements 101, 102 and 103. Lens elements 101 and 102 are cemented doublet elements. Lens element 103 is an air spaced singlet element. Lens element 101 is air spaced from the image plane 20 by a distance necessary to keep the object plane 18 to image plane 20 distance fixed at 1.75 meters through all magnifications. Lens element 101 is a meniscus lens element with surfaces of radii R1 and R2. The concave surface (having radius R2) of lens element 101 is cemented to bi-convex lens element 102 having surfaces of radii R2 and R3. Lens element 103 is air spaced from lens element 102 by air space $d_1$. Lens element 103 is a meniscus lens element having radii R4 and R5 with the convex surface of lens element 103 facing left in the diagrams.

The lens elements of group 12 and the lens elements of group 14 are air spaced from each other by distance $d_2$.

Group 14 consists of a meniscus element air spaced from a cemented doublet which in turn is air spaced from a second meniscus element, namely lens elements 104, 105, 106 and 107. Lens element 104 is a meniscus lens element having radii R6 and R7 with the convex surface facing left in the diagrams. Lens element 104 is air spaced from lens element 105 by distance $d_3$. Lens elements 105 and 106 are cemented doublet lens elements. Lens element 105 is a bi-concave lens element having radii R8 and R9. The surface of lens element having radius R8 is cemented to lens element 106 having radii R9 and R10. Lens element 106 is air spaced from lens element 107 by distance $d_4$. Lens element 107 is a meniscus lens element having radii R11 and R12 with the concave surface of lens element 107 facing to the left in the diagrams.

The lens elements of group 14 and the lens elements of group 16 are air spaced from each other by distance $d_5$.

Group 16 consists of a biconvex element air spaced from a cemented doublet, followed in order by an airspace, a meniscus, an air space, a meniscus, an air space and a final doublet, namely lens elements 108, 110, 111, 112, 113, 114 and 115. Lens element 108 is a bi-convex lens element having radii R13 and R14. Lens element 108 is air spaced from stop 109 by distance $d_6$. Stop 109 is air spaced from lens element 110 by distance $d_7$. Lens elements 110 and 111 consist of a cemented doublet. Lens element 110 is a bi-convex lens element having radii R15 and R16. The surface of lens element 110 having radii R16 is cemented to lens element 111. Lens element 111 is bi-concave lens element having radii R16 and R17. Lens element 111 is air spaced from lens element 112 by distance $d_8$. Lens element 112 is a meniscus lens element having radii R18 and R19 with the convex surface facing left in the diagrams. Lens element 112 is air spaced from lens element 113 by distance $d_9$. Lens element 113 is a meniscus lens element having radii R20 and R21 with the concave surface of lens element 113 facing to the left in the diagrams. Lens element 113 is air spaced from lens element 114 by distance $d_{10}$. Lens elements 114 and 115 form a cemented doublet. Lens element 114 is a meniscus lens element having radii R22 and R23 with the convex surface of lens element 114 facing to the left in the diagrams. The surface of lens element 114 having radius R23 is cemented to lens element 115. Lens element 115 is a meniscus lens element having radii R23 and R24 again with the convex surface of lens element 115 facing to the left in the diagrams.

Lens element 115 is separated from glass platen 18 (not a part of zoom lens 10) by distance $d_{11}$.

Numerical characteristics for this preferred embodiment of zoom lens 10 are specified in Table 1. The lens element, spacing and surface reference characters used in Table 1 correspond to the reference characters in FIGS. 1, 2 and 3. Distances $d_1$ through $d_{11}$ correspond to the distances between the various lens elements and the distance between the right most lens element 115 of group 16 and glass platen 18. Surface radii R1 through R24 are the radii of curvature of the surfaces of the lens elements 101 through 115 in succession from the left side (opposite the side of incident light), with negative (−) radii indicative of surfaces which are concave toward the side opposite from the incident light. All distances, radii and thicknesses of lens elements are specified in millimeters (mm). The specified thicknesses of lens elements 101 through 115 are the thicknesses on the central optical axis A. The indices of refraction $N_d$ of the glasses from which the lens elements 101 through 115 are fabricated are specified for the Sodium d line. The number $V_d$ is the Abbe number or dispersion factor of the associated lens element.

TABLE 1

| Lens Element & Spacing | Surface | Radius (mm) | Thickness & Distance (mm) | $N_d$ | $V_d$ |
|---|---|---|---|---|---|
| 101 | R1 | 105.373 | 4.270 | 1.805 | 25.5 |
| 102 | R2 | 58.560 | 17.216 | 1.620 | 60.3 |
| $d_1$ | R3 | −227.420 | 7.019 | | |
| 103 | R4 | 62.300 | 5.010 | 1.697 | 55.5 |
| $d_2$ | R5 | 66.815 | Variable 1 | | |
| 104 | R6 | 99.225 | 3.505 | 1.834 | 37.3 |
| $d_3$ | R7 | 37.495 | 9.218 | | |
| 105 | R8 | −52.900 | 3.100 | 1.557 | 58.7 |
| 106 | R9 | 47.100 | 5.157 | 1.847 | 23.8 |
| $d_4$ | R10 | −176.130 | 3.157 | | |
| 107 | R11 | −43.752 | 2.822 | 1.697 | 55.5 |
| $d_5$ | R12 | −235.745 | Variable 2 | | |
| 108 | R13 | 48.996 | 4.003 | 1.697 | 55.5 |
| $d_6$ | R14 | −353.777 | 2.806 | | |
| 109 | | STOP | | | |
| $d_7$ | | | 2.007 | | |
| 110 | R15 | 45.909 | 4.120 | 1.557 | 58.7 |
| 111 | R16 | −54.420 | 10.151 | 1.834 | 37.3 |
| $d_8$ | R17 | 97.210 | 4.188 | | |
| 112 | R18 | 96.865 | 7.206 | 1.805 | 25.5 |
| $d_9$ | R19 | 33.790 | 2.007 | | |
| 113 | R20 | −1,062.755 | 3.506 | 1.589 | 61.2 |
| $d_{10}$ | R21 | −62.527 | 5.350 | | |
| 114 | R22 | 44.170 | 7.983 | 1.569 | 63.2 |
| 115 | R23 | 57.142 | 3.160 | 1.673 | 32.1 |
| $d_{11}$ | R24 | 128.760 | Variable 3 | | |
| 20 | | PLANO | 3.000 | 1.517 | 64.2 |

The values for variable 1, variable 2 and variable 3 are substantially as shown in Table 2. Magnification refers to the magnification power of the lens. EFL refers to the effective focal length of the lens at the wavelength of light.

TABLE 2

| Magnification | Variable 1 (mm) | Variable 2 (mm) | Variable 3 (mm) | EFL @ 587.6 nanometers |
|---|---|---|---|---|
| 32x | 4.5151 | 69.9953 | 48.7076 | 49.86 millimeters, f/5 |
| 15x | 5.1416 | 23.7738 | 87.8015 | 101.73 millimeters, f/11 |
| 6.8x | 10.5117 | 2.0005 | 157.9455 | 195.28 millimeters, f/20 |

Iris diaphragm 109, which functions as an aperature stop, is located in the air space between lens element 108 and lens element 110 as shown in Table 1. The iris diaphragm varies as zoom lens 10 is zoomed so as to produce a finite aperture of f/5 at 32x and f/20 at 6.8x in order to greatly increase depth of focus at the lower magnification to yield a reasonable depth of field, which is, of course, dependent upon on the product of depth of focus and the square of the magnification.

FIGS. 4A, 4B, 4C, 4D, 4E, 4F, 4G, 4H and 4I illustrate the ray aberrations of zoom lens 10 at a magnification ratio of 32x.

FIGS. 5A, 5B, 5C, 5D, 5E, 5F, 5G, 5H and 5I illustrate the ray aberrations of zoom lens 10 at a magnification ratio of 15x.

FIGS. 6A, 6B, 6C, 6D, 6E, 6F, 6G, 6H and 6I illustrate the ray abberations of zoom lens 10 at a magnification ratio of 6.8x.

Figure 7A:
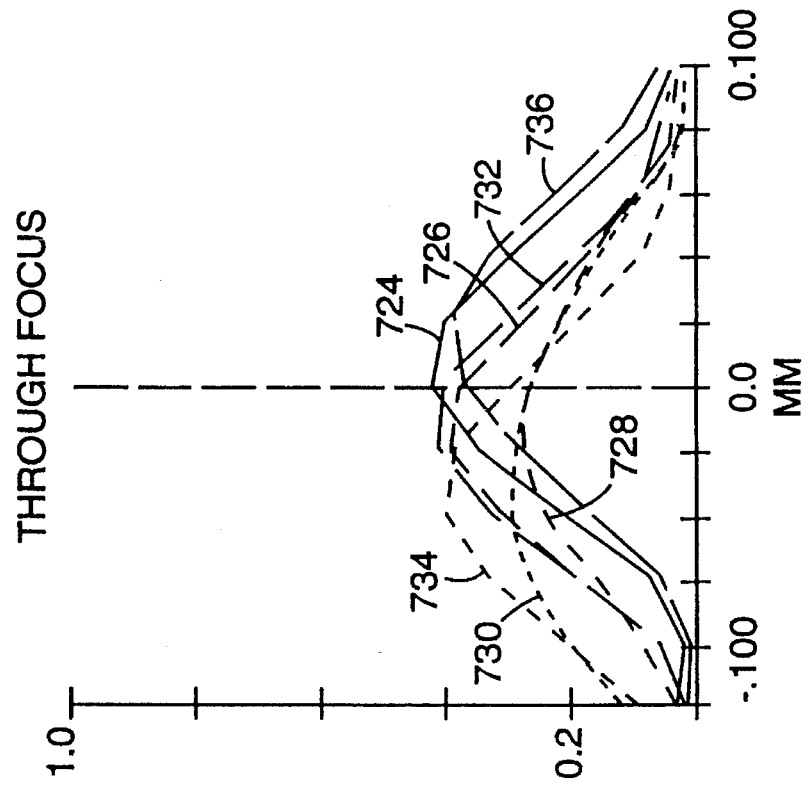
FIGS. 7A and 7B are graphs illustrating the diffraction modulation transfer function (MTF) characteristics of the lens of FIG. 1 (at a magnification of 32x)
Figure 7B:
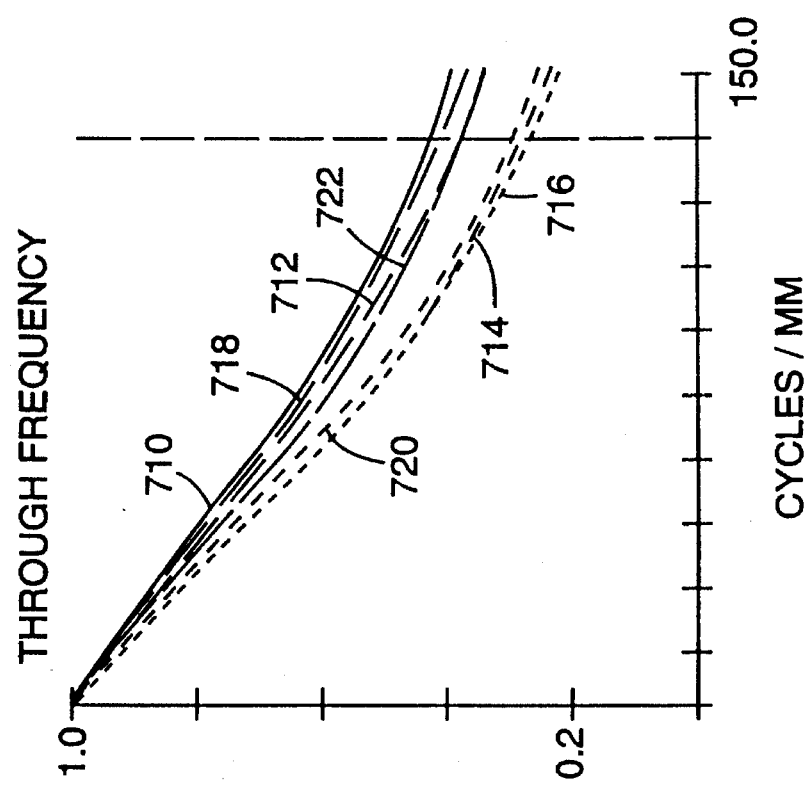

FIGS. 7A and 7B illustrate the diffraction modulation transfer function (MTF) characteristics of zoom lens 10 at a magnification ratio of 32x.

FIG. 7A represents the modulation transfer function (MTF) illustrated by response of zoom lens 10 as a function of frequency. FIG. 7B represents the modulation transfer function (MTF) illustrated by response of zoom lens 10 as a function of focus shift at a frequency of 135 Cycles/mm. All curves are weighted by light with a wavelength of 0.58756 microns having a weight of 1.0, light with a wavelength of 0.48613 having a weight of 0.5 and light with a wavelength of 0.65628 having a weight of 0.5. Curves 710 and 724, FIGS. 7A and 7B respectively, represent the tangential response of zoom lens 10 taken on axis. Curves 712 and 726, FIGS. 7A and 7B respectively, represent the tangential response of zoom lens 10 taken at 0.35 of the field. Curves 714 and 728, FIGS. 7A and 7B respectively, represent the tangential response of zoom lens 10 taken at 0.71 of the field. Curves 716 and 730, FIGS. 7A and 7B respectively, represent the tangential response of zoom lens 10 taken at 1.00 of the field. Curves 718 and 732, FIGS. 7A and 7B respectively, represent the sagittal response of zoom lens 10 taken at 0.35 of the field. Curves 720 and 734, FIGS. 7A and 7B respectively, represent the sagittal response of zoom lens 10 taken at 0.71 of the field. Curves 722 and 736, FIGS. 7A and 7B respectively, represent the sagittal response of zoom lens 10 taken at 1.00 of the field.

Figure 8B:
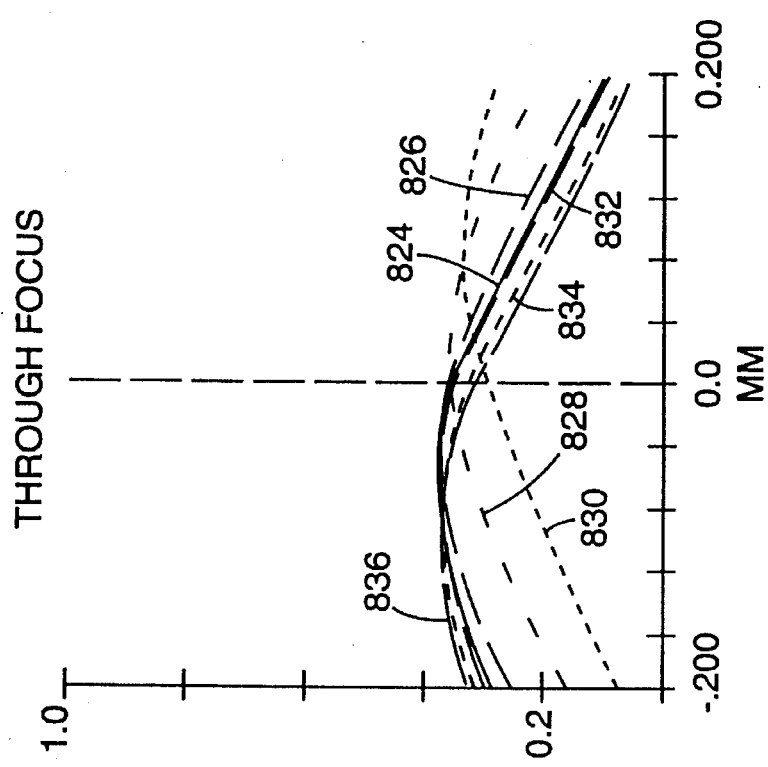
FIGS. 8A and 8B are graphs illustrating the diffraction modulation transfer function (MTF) characteristics of the lens of FIG. 2 (at a magnification of 15x)
Figure 8A:
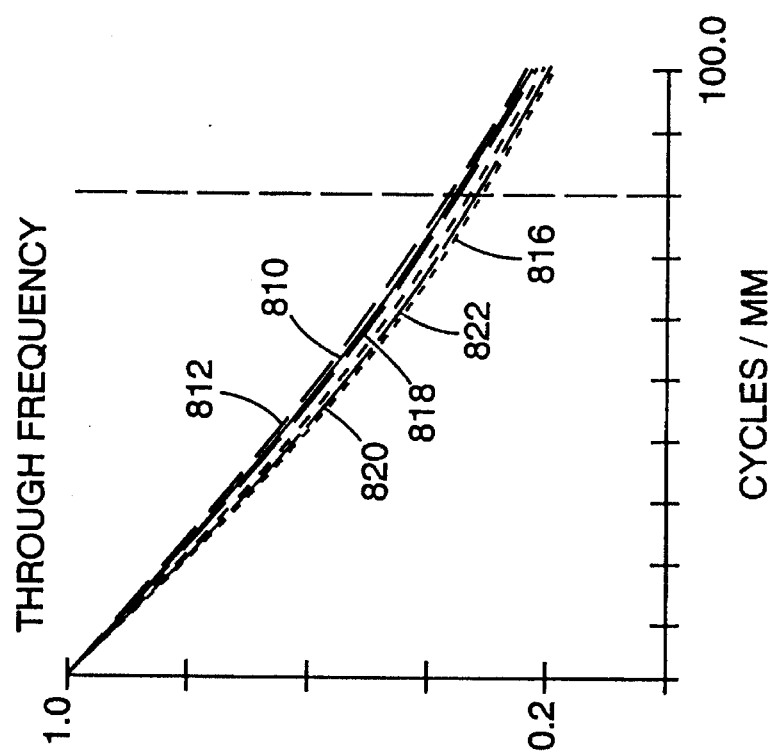

FIGS. 8A and 8B illustrate the diffraction modulation transfer function (MTF) characteristics of zoom lens 10 at a magnification ratio of 15x.

FIG. 8A represents the modulation transfer function (MTF) illustrated by response of zoom lens 10 as a function of frequency. FIG. 8B represents the modulation transfer function (MTF) illustrated by response of zoom lens 10 as a function of focus shift at a frequency of 135 cycles/min. All curves are weighted by light with a wavelength of 0.58756 microns having a weight of 1.0, light with a wavelength of 0.48613 having a weight of 0.5 and light with a wavelength of 0.65628 having a weight of 0.5. Curves 810 and 824, FIGS. 8A and 8B respectively, represent the tangential response of zoom lens 10 taken on axis. Curves 812 and 826, FIGS. 8A and 8B respectively, represent the tangential response of zoom lens 10 taken at 0.35 of the field. Curve 828, FIG. 8B, represents the tangential response of zoom lens 10 taken at 0.71 of the field. Curves 816 and 830, FIGS. 8A and 8B respectively, represent the tangential response of zoom lens 10 taken at 1.00 of the field. Curves 818 and 832, FIGS. 8A and 8B respectively, represent the sagittal response of zoom lens 10 taken at 0.35 of the field. Curves 820 and 834, FIGS. 8A and 8B respectively, represent the sagittal response of zoom lens 10 taken at 0.71 of the field. Curves 822 and 836, FIGS. 8A and 8B respectively, represent the sagittal response of zoom lens 10 taken at 1.00 of the field.

Figure 9A:
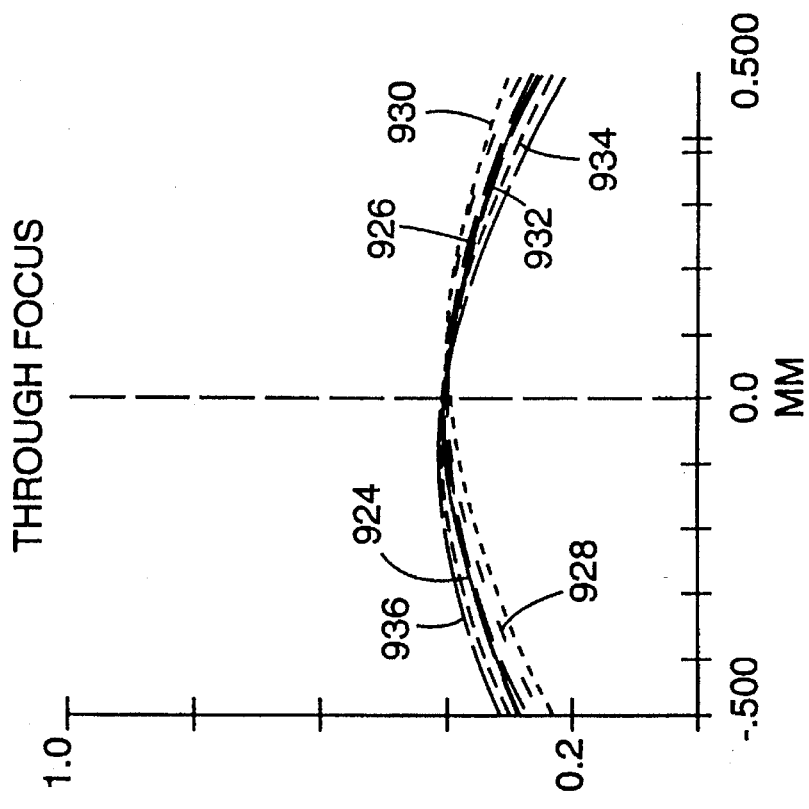
FIGS. 9A and 9B are graphs illustrating the diffraction modulation transfer function (MTF) characteristics of the lens of FIG. 3 (at a magnification of 6.8x).
Figure 9B:
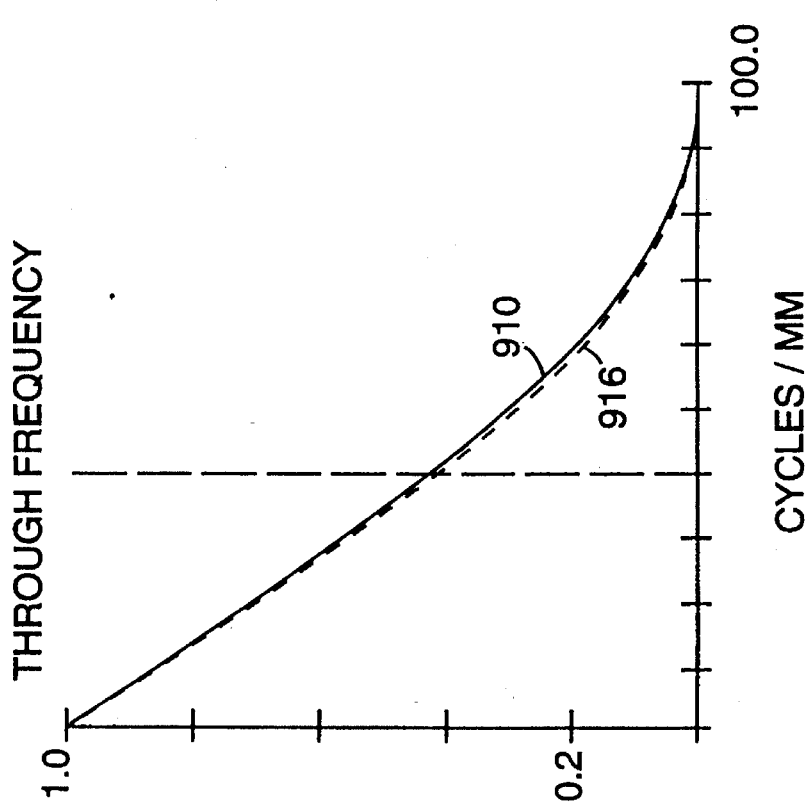

FIGS. 9A and 9B illustrate the diffraction modulation transfer function (MTF) characteristics of zoom lens 10 at a magnification ratio of 6.8x.

FIG. 9A represents the modulation transtar function (MTF) illustrated by response of zoom lens 10 as a function of frequency. FIG. 9B represents the modulation transfer function (MTF) illustrated by response of zoom lens 10 as a function of focus shift at a frequency of 135 cycles/ram. All curves are weighted by light with a wavelength of 0.58756 microns having a weight of 1.0, light with a wavelength of 0.48613 having a weight of 0.5 and light with a wavelength of 0.65628 having a weight of 0.5. Curves 910 and 924, FIGS. 9A and 9B respectively, represent the tangential response of zoom lens 10 taken on axis. Curve 926, FIG. 9B, represents the tangential response of zoom lens 10 taken at 0.35 of the field. Curve 928, FIG. 9B, represents the tangential response of zoom lens 10 taken at 0.71 of the field. Curves 916 and 930, FIGS. 9A and 9B respectively, represent the tangential response of zoom lens 10 taken at 1.00 of the field. Curve 932, FIG. 9B, represents the sagittal response of zoom lens 10 taken at 0.35 of the field. Curve 934, FIG. 9B, represents the sagittal response of zoom lens 10 taken at 0.71 of the field. Curve 936, FIG. 9B, represents the sagittal response of zoom lens 10 taken at 1.00 of the field.

Thus, it can be seen that there has been shown and described a novel invention as described above. It is to be recognized and understood, however, that various changes, modifications and substitutions in the form and the details of the present invention may be made by those skilled in the art without departing from the scope of the invention as defined by the following claims.

What is claimed is:

1. A micrographic stepless zoom lens, comprising, in succession from a side opposite from the side of incident light:

a first group comprising:

a first cemented doublet including a first meniscus lens element, convex toward said side opposite from the side of incident light, and a first biconvex lens element; and a second meniscus lens element, convex toward said side opposite from the side of incident light, air spaced from said first cemented doublet; a second group comprising:

a third meniscus lens element, convex toward said side opposite from the side of incident light;

a second cemented doublet including a first biconcave lens element and a second biconvex lens element; and a fourth meniscus lens element, concave toward said side opposite from the side of incident light, air spaced from said second cemented doublet; and a third group comprising:

a third biconvex lens element;

a third cemented doublet including a fourth biconvex lens element and a second biconcave lens element, air spaced from said third biconvex lens element;

a fifth meniscus lens element, convex toward said side opposite from the side of incident light, air spaced from said third cemented doublet;

a sixth meniscus lens element, concave toward said side opposite from the side of incident light, air spaced from said fifth meniscus lens element; and a fourth cemented doublet including a seventh meniscus lens element, convex toward said side opposite from the side of incident light, and an eighth meniscus lens element, convex toward said side opposite from the side of incident light, air spaced from said sixth meniscus lens element.

2. A micrographic stepless zoom lens as in claim 1 which further comprises an iris diaphragm positioned between said third biconvex lens element and said third cemented doublet in said third group.

3. A micrographic stepless zoom lens as in claim 2 in which said first group, said second group and said third group all move relative to each other during zooming.

4. A micrographic stepless zoom lens as in claim 3 wherein the lens is an f/5 lens at 32x and an f/20 lens at 6.8x with numerical characteristics substantially as follows:

| Lens Element & Spacing | Surface | Radius (mm) | Thickness & Distance (mm) | $N_d$ | $V_d$ |
|---|---|---|---|---|---|
| 101 | R1 | 105.373 | 4.270 | 1.805 | 25.5 |
|  | R2 | 58.560 |  |  |  |
| 102 |  |  | 17.216 | 1.620 | 60.3 |
|  | R3 | −227.420 |  |  |  |
| $d_1$ |  |  | 7.019 |  |  |
|  | R4 | 62.300 |  |  |  |
| 103 |  |  | 5.010 | 1.697 | 55.5 |
|  | R5 | 66.815 |  |  |  |
| $d_2$ |  |  | Variable 1 |  |  |
|  | R6 | 99.225 |  |  |  |
| 104 |  |  | 3.505 | 1.834 | 37.3 |
|  | R7 | 37.495 |  |  |  |
| $d_3$ |  |  | 9.218 |  |  |
|  | R8 | −52.900 |  |  |  |
| 105 |  |  | 3.100 | 1.557 | 58.7 |
|  | R9 | 47.100 |  |  |  |
| 106 |  |  | 5.157 | 1.847 | 23.8 |
|  | R10 | −176.130 |  |  |  |
| $d_4$ |  |  | 3.157 |  |  |
|  | R11 | −43.752 |  |  |  |

-continued

| Lens Element & Spacing | Surface | Radius (mm) | Thickness & Distance (mm) | $N_d$ | $V_d$ |
|---|---|---|---|---|---|
| 107 | | | 2.822 | 1.697 | 55.5 |
| | R12 | −235.745 | | | |
| $d_5$ | | | Variable 2 | | |
| | R13 | 48.996 | | | |
| 108 | | | 4.003 | 1.697 | 55.5 |
| | R14 | −353.777 | | | |
| $d_6$ | | | 2.806 | | |
| 109 | | STOP | | | |
| $d_7$ | | | 2.007 | | |
| | R15 | 45.909 | | | |
| 110 | | | 4.120 | 1.557 | 58.7 |
| | R16 | −54.420 | | | |
| 111 | | | 10.151 | 1.834 | 37.3 |
| | R17 | 97.210 | | | |
| $d_8$ | | | 4.188 | | |
| | R18 | 96.865 | | | |
| 112 | | | 7.206 | 1.805 | 25.5 |
| | R19 | 33.790 | | | |
| $d_9$ | | | 2.007 | | |
| | R20 | −1,062.755 | | | |
| 113 | | | 3.506 | 1.589 | 61.2 |
| | R21 | −62.527 | | | |
| $d_{10}$ | | | 5.350 | | |
| | R22 | 44.170 | | | |
| 114 | | | 7.983 | 1.569 | 63.2 |
| | R23 | 57.142 | | | |
| 115 | | | 3.160 | 1.673 | 32.1 |
| | R24 | 128.760 | | | |
| $d_{11}$ | | | Variable 3 | | |
| 20 | | PLANO | 3.000 | 1.517 | 64.2 | wherein:
numbers 101–115 refer to the lens elements in succession from said side opposite from the side of incident light;
spacings $d_1$–$d_{11}$ refer to the distances between lens elements 101–115;
surfaces R1–R24 refer to the surfaces of the lens elements in succession from said side opposite from the side of incident light;
$N_d$ refers to the refractive indices of the lens elements at the sodium d line;
$V_d$ refers to the Abbe numbers of the materials of the lens elements; wherein variable 1, variable 2 and variable 3 are substantially as follows:

| Magnification | Variable 1 (mm) | Variable 2 (mm) | Variable 3 (mm) | EFL @ 587.6 nanometers |
|---|---|---|---|---|
| 32x | 4.5151 | 69.9953 | 48.7076 | 49.86 millimeters, f/5 |
| 15x | 5.1416 | 23.7738 | 87.8015 | 101.73 millimeters, f/11 |
| 6.8x | 10.5117 | 2.0005 | 157.9455 | 195.28 millimeters, f/20 | wherein:
magnification refers to the magnification power of the lens;
EFL refers to the effective focal length of the lens at the wavelength of light.

5. A zoom lens as in claim 4 wherein the distance from element 20 to the image plane of the zoom lens is constant at 1.75 meters for all magnifications.

* * * * *